United States Patent
Phillips et al.

(10) Patent No.: US 6,808,806 B2
(45) Date of Patent: Oct. 26, 2004

(54) METHODS FOR PRODUCING IMAGED COATED ARTICLES BY USING MAGNETIC PIGMENTS

(75) Inventors: Roger W. Phillips, Santa Rosa, CA (US); Charlotte R. LeGallee, Healdsburg, CA (US); Charles T. Markantes, Santa Rosa, CA (US); Paul G. Coombs, Santa Rosa, CA (US); Matthew R. Witzman, Santa Rosa, CA (US)

(73) Assignee: Flex Products, Inc., Santa Rosa, CA (US)

( * ) Notice: Subject to any disclaimer, the term of this patent is extended or adjusted under 35 U.S.C. 154(b) by 26 days.

(21) Appl. No.: 09/850,421

(22) Filed: May 7, 2001

(65) Prior Publication Data

US 2002/0182383 A1 Dec. 5, 2002

(51) Int. Cl.[7] .................................................. B32B 5/16
(52) U.S. Cl. .................. 428/403; 428/402; 428/402.24; 428/411.1; 428/357; 427/128; 106/456; 106/480; 359/584; 359/585; 359/388
(58) Field of Search ................................ 359/584, 585, 359/588; 106/456, 480; 427/128; 428/357, 402, 402.24, 411.1, 403

(56) References Cited

U.S. PATENT DOCUMENTS

| | | | | |
|---|---|---|---|---|
| 4,105,572 A | * | 8/1978 | Gorondy | 430/106.2 |
| 4,272,602 A | * | 6/1981 | Stemme et al. | 430/140 |
| 4,323,904 A | * | 4/1982 | Edwards et al. | 346/74.7 |
| 4,428,974 A | * | 1/1984 | Okita et al. | 427/495 |
| 4,859,495 A | * | 8/1989 | Peng | 427/548 |
| 5,217,804 A | * | 6/1993 | James et al. | 428/329 |
| 6,150,022 A | * | 11/2000 | Coulter et al. | 428/403 |

* cited by examiner

*Primary Examiner*—Cynthia H. Kelly
*Assistant Examiner*—Tamara L. Dicus
(74) *Attorney, Agent, or Firm*—Holme Roberts & Owen LLP

(57) ABSTRACT

Methods and devices for producing images on coated articles are provided. The methods generally comprise applying a layer of magnetizable pigment coating in liquid form on a substrate, with the magnetizable pigment coating containing a plurality of magnetic non-spherical particles or flakes. A magnetic field is then applied to selected regions of the pigment coating while the coating is in liquid form, with the magnetic field altering the orientation of selected magnetic particles or flakes. Finally, the pigment coating is solidified, affixing the reoriented particles or flakes in a non-parallel position to the surface of the pigment coating to produce an image such as a three dimensional-like image on the surface of the coating. The pigment coating can contain various interference or non-interference magnetic particles or flakes, such as magnetic color shifting pigments.

21 Claims, 6 Drawing Sheets

METHODS FOR PRODUCING IMAGED COATED ARTICLES BY USING MAGNETIC PIGMENTS

BACKGROUND OF THE INVENTION

1. The Field of the Invention

The present invention relates generally to methods of forming coated articles. In particular, the present invention relates to methods for producing coated articles having three dimensional-like images using magnetic pigment compositions.

2. The Relevant Technology

Various pigments, colorants, and foils have been developed for a wide variety of applications. For example, magnetic pigments have been developed for use in applications such as decorative cookware, creating patterned surfaces, and security devices. Similarly, color shifting or optically variable pigments have been developed for such uses as cosmetics, inks, coating materials, ornaments, ceramics, automobile paints, anti-counterfeiting hot stamps, and anti-counterfeiting inks for security documents and currency.

Color shifting pigments, colorants, and foils exhibit the property of changing color upon variation of the angle of incident light, or as the viewing angle of the observer is shifted. The color-shifting properties of pigments and foils can be controlled through proper design of the optical thin films or orientation of the molecular species used to form the flake or foil coating structure. Desired effects can be achieved through the variation of parameters such as thickness of the layers forming the flakes and foils and the index of refraction of each layer. The changes in perceived color which occur for different viewing angles or angles of incident light are a result of a combination of selective absorption of the materials comprising the layers and wavelength dependent interference effects. The interference effects, which arise from the superposition of light waves that have undergone multiple reflections, are responsible for the shifts in color perceived with different angles. The reflection maxima changes in position and intensity, as the viewing angle changes, due to changing interference effects arising from light path length differences in the various layers of the optical stack.

Various approaches have been used to achieve such color shifting effects. For example, small multilayer flakes, typically composed of multiple layers of thin films, are dispersed throughout a medium such as paint or ink that may then be subsequently applied to the surface of an object. Such flakes may optionally be overcoated to achieve desired colors and optical effects. Another approach is to encapsulate small metallic or silicatic substrates with varying layers and then disperse the encapsulated substrates throughout a medium such as paint or ink. Additionally, foils composed of multiple layers of thin films on a substrate material have been made.

One manner of producing a multilayer thin film structure is by forming it on a flexible web material with a release layer thereon. The various layers are deposited on the web by methods well known in the art of forming thin coating structures, such as PVD, sputtering, or the like. The multilayer thin film structure is then removed from the web material as thin film color shifting flakes, which can be added to a polymeric medium such as various pigment vehicles for use as an ink or paint. In addition to the color shifting flakes, additives can be added to the inks or paints to obtain desired color shifting results.

Color shifting pigments or foils are formed from a multilayer thin film structure that includes the same basic layers. These include an absorber layer(s), a dielectric layer(s), and optionally a reflector layer, in varying layer orders. One skilled in the art will recognize that an absorber layer is a semi-absorbing, semi transparent layer. The coatings can be formed to have a symmetrical multilayer thin film structure, such as:

absorber/dielectric/reflector/dielectric/absorber; or
    absorber/dielectric/absorber.

Coatings can also be formed to have an asymmetrical multilayer thin film structure, such as:

absorber/dielectric/reflector.

For example, U.S. Pat. No. 5,135,812 to Phillips et al., which is incorporated by reference herein, discloses color-shifting thin film flakes having several different configurations of layers such as transparent dielectric and partially absorbing stacks. In U.S. Pat. No. 5,278,590 to Phillips et al., which is incorporated by reference herein, a symmetric three layer optical interference coating is disclosed which comprises first and second partially transmitting absorber layers which have essentially the same material and thickness, and a dielectric spacer layer located between the first and second absorber layers.

Color shifting platelets for use in paints are disclosed in U.S. Pat. No. 5,571,624 to Phillips et al., which is incorporated by reference herein. These platelets are formed from a symmetrical multilayer thin film structure in which a first absorber layer such as chromium is formed on a substrate, with a first dielectric layer formed on the first absorber layer. A reflecting metal layer such as aluminum is formed on the first dielectric layer, followed by a second dielectric layer. A second absorber layer is formed on the second dielectric layer.

With regard to magnetic pigments, U.S. Pat. No. 4,838,648 to Phillips et al. (hereinafter "Phillips '648"), the disclosure of which is incorporated by reference, describes a thin film magnetic color shifting structure in which a magnetic material can be used as a reflector or absorber layer in the structure. One disclosed magnetic material is a cobalt nickel alloy. Phillips '648 discloses flakes and foils with the following structures:

dyed superstrate/absorber/dielectric/magnetic layer/substrate;

dyed superstrate/absorber/dielectric/magnetic layer/dielectric/absorber/dyed superstrate; and adhesive/magnetic layer/dielectric/absorber/releasable hardcoat/substrate.

Patterned surfaces have been provided by exposing magnetic flakes to a magnetic force to effect a physical alteration in the structure of the pigment. For example, U.S. Pat. No. 6,103,361 to Batzar et al. (hereinafter "Batzar") uses pigments made of magnetizable materials to decorate cookware. In particular, Batzar is directed toward controlling the orientation of stainless steel flakes in a fluoropolymer release coating to make patterns where at least some of the flakes are longer than the coating thickness. The patterned substrate is formed by applying magnetic force through the edges of a magnetizable die positioned under a coated base to alter the orientation of the flakes within the coating, thereby creating an imaging effect or pattern. However, Batzar does not discuss the use of optical thin film stacks or platelets employing a magnetic layer. In addition, although the stainless steel flakes used in Batzar are suitable for decorating cookware, they are poorly reflecting.

U.S. Pat. No. 2,570,856 to Pratt et al (hereinafter "Pratt") is directed to metallic flake pigments which are based on ferromagnetic metal platelets. Like Batzar, however, Pratt uses poorly reflecting metals and does not teach the use of thin film optical stacks.

U.S. Pat. No. 5,364,689 to Kashiwagi et al. and U.S. Pat. No. 5,630,877, also to Kashiwagi, (hereinafter collectively "Kashiwagi") disclose methods and apparatus for creating magnetically formed painted patterns. Kashiwagi uses a magnetic paint layer, which includes non-spherical magnetic particles in a paint medium, and applies a magnetic field with the magnetic field lines in the shape of the desired pattern. The final pattern is created by the different magnetic particle orientations in the hardened paint.

One attempt at incorporating a magnetic layer into a multilayer flake is disclosed in European Patent Publication EP 686675B1 to Schmid et al. (hereinafter "Schmid"), the disclosure of which is incorporated by reference. Schmid describes laminar color shifting structures which include a magnetic layer between the dielectric layer and a central aluminum layer as follows:

oxide/absorber/dielectric/magnet/Al/magnet/dielectric/ absorber/oxide

Thus, Schmid uses aluminum platelets and then coats these platelets with magnetic materials. However, the overlying magnetic material downgrades the reflective properties of the pigment because aluminum is the second brightest metal (after silver), meaning any magnetic material is less reflective. Further, Schmid starts with aluminum platelets generated from ballmilling, a method which is limited in terms of the layer smoothness that can be achieved.

Patent Publication EP 710508A1 to Richter et al. (hereinafter "Richter") discloses methods for providing three dimensional effects by drawing with magnetic tips. Richter describes three dimensional effects achieved by aligning magnetically active pigments in a spatially-varying magnetic field. Richter uses standard pigments (barium ferrite, strontium ferrite, samarium/cobalt, Al/Co/Ni alloys, and metal oxides made by sintering and quick quenching, none of which are composed of optical thin film stacks. Rather, the particles are of the hard magnetic type. Richter uses electromagnetic pole pieces either on top of the coating or on both sides of the coating. However, Richter uses a moving system and requires "drawing" of the image. This "drawing" takes time and is not conducive to production type processes.

U.S. Pat. No. 3,791,864 to Steingroever (hereinafter "Steingroever") describes a method for patterning magnetic particles by orienting them with a magnetic pattern generated in an underlying prime coating that has previously been patterned by a magnetic field. The prime coat contains magnetic particles of the type "MO×6Fe$_2$O$_3$" where M can be one or more of the elements Ba, Sr, Co, or Pb. After coating a continuous sheet of liquid coating of the primer, it is solidified and then areas of the primer are magnetized by a magnetic field. Next, a pigment vehicle with magnetic particles suspended therein is then applied. The magnetic particles suspended therein are finally oriented by the magnetic force from the magnetic pattern in the primer, creating the final pattern. However, Steingroever suffers from a diffuse magnetic image in the prime coat, which in turn passes a diffuse image to the topcoat. This reduction in resolution is because high magnetic fields are limited in the resolution they can create. This limitation is due to high magnetic field lines surrounding the intended magnetic image, thereby affecting untargeted magnetic particles in the prime coat and blurring the image.

Accordingly, there is a need for improved methods and devices that overcome or avoid the above problems and limitations.

SUMMARY AND OBJECTS OF THE INVENTION

It is an object of the invention to provide printed images with three-dimensional like features.

It is another object of the invention to provide imaged coating structures with covert and/or overt security features.

It is yet another object of the invention to provide methods to fabricate magnetic printed images that are compatible with mass production.

To achieve the foregoing objects and in accordance with the invention as embodied and broadly described herein, methods and devices for fabricating three dimensional-like images on coated articles are provided. The methods generally comprise applying a layer of magnetizable pigment coating in liquid form on a substrate, with the magnetizable pigment coating containing a plurality of magnetic non-spherical particles or flakes. A magnetic field is exposed to selected regions of the pigment coating while the coating is in liquid form, with the magnetic field altering the orientation of selected magnetic particles or flakes. Finally, the pigment coating is solidified, affixing the reoriented particles or flakes in a non-parallel (or intermediate) position to the surface of the pigment coating to produce an image or a three dimensional-like image on the surface of the coating. The pigment coating can contain various interference or non-interference magnetic particles or flakes, including magnetic color shifting pigments.

In one method of the invention, the magnetic field is provided by a magnetic printed image layer applied to the substrate prior to applying the pigment coating. In another method, an external magnetic source is utilized such as a sheet magnet configured in the shape of the desired image, with the sheet magnet placed on the surface of the substrate opposite the pigment coating. Other external magnetic sources that can be used include a DC magnetron sputtering magnetic cathode, a magnetizable die selectively magnetized by a secondary magnetic source, or multiple magnetic poles oriented together to from an image below the substrate.

A preferred pigment composition for use with the present methods includes multilayer magnetic thin film flakes or particles, which can have a symmetrical stacked coating structure on opposing sides of a magnetic core layer, or can be formed with one or more encapsulating coatings around a magnetic or dielectric core. Optional additional layers, such as dielectric and absorber layers, can be added to overlie the flakes or particles and thereby add a color shift or other features to the pigments. Suitable pigment flakes include those that have a magnetic layer between reflector or dielectric layers, a dielectric layer between magnetic layers, or monolithic magnetic layers.

These and other objects and features of the present invention will become more fully apparent from the following description and appended claims, or may be learned by the practice of the invention as set forth hereinafter.

BRIEF DESCRIPTION OF THE DRAWINGS

In order to illustrate the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE INVENTION

Figure 1:
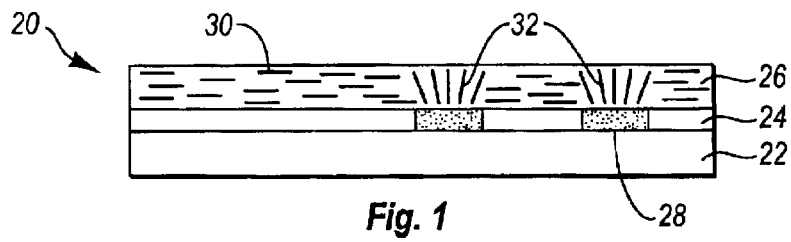
FIG. 1 is a cross-sectional schematic representation of an imaged coating product according to one embodiment of the invention.

The present invention is directed to methods and devices for producing coated articles such as imaged coating products which have been discovered as being capable of generating three dimensional-like images on a surface thereof. The methods generally comprise applying a layer of magnetizable pigment coating in liquid form on a substrate, with the magnetizable pigment coating containing a plurality of magnetic non-spherical particles or flakes. A magnetic field is then applied to selected regions of the pigment coating while the coating is in liquid form, with the magnetic force altering the orientation of selected magnetic particles or flakes. Finally, the pigment coating is solidified, thereby affixing the reoriented particles or flakes in a non-parallel (or intermediate) position to the surface of the pigment coating.

Devices according to the invention include structures capable of performing the above method, and include various elements selected from a substrate, a magnetizable pigment, and means for producing an external magnetic field.

The three dimensional-like effects are produced by exposing the magnetic pigment coating to an external magnetic force, thereby orienting the major planar surfaces of some of the pigment flakes substantially normal to the surface of the coating. The unoriented pigment flakes lie with their major planar surfaces substantially parallel to the surface of the coating. The three dimensional-like effect is due to the alignment of the pigment flakes or particles such that the aspect ratio is oriented with the magnetic field, i.e., the longest part of the pigment flake or particle aligns itself along the magnetic field lines. Thus, colored faces of the pigment flakes that are magnetically reoriented are turned away from the observer to various extents depending on the magnitude of the magnetic force. In the region(s) of maximum reorientation (normal), the coating appears black in color due to light trapping. Moving off the black region(s), the coating appears to gradually change to the color of the remaining surfaces regions that have not been magnetically reoriented. For example, such unoriented surface regions would appear silver in color when an aluminum pigment is used, or would have other colors depending on the pigment. The resulting image has a colored three dimensional-like effect, similar to that of a holographic effect, which appears to move as the viewing angle changes. In particular, interference pigments such as color shifting or optically variable pigments enhance the effect.

The pigment coatings that can be used in the present invention comprise pigment vehicles with magnetic non-spherical particles or substantially planar magnetic flakes. Suitable pigments include multilayer color shifting magnetic pigments, although other magnetic pigments with the required magnetism and aspect ratio are compatible with the methods of the present invention.

Security features can be provided to various objects having an imaged coating product applied thereto, by the visual three dimensional-like effect described above and by the characteristics of the magnetic pigments. For example, magnetic layers can be covertly embedded within multilayer pigment flakes so that the magnetic layer has no effect on the optical effect provided by the multilayer flake, apart from the orientation shift described herein. However, with a magnetic detection system, the magnetic layer can be detected. Covert magnetic signatures can also be applied in a printed magnetic image applied between a magnetizable coating layer and a substrate. Also, flakes oriented in the normal direction to the substrate will have a finite magnetization or magnetic dipole which is also oriented in the normal direction to the substrate. This allows the oriented flakes to be separately machine readable. Based on these principles, a variety of both overt and covert magnetic security features can be designed, as described hereinbelow.

In general, the present invention represents an advance in the art by enabling the imaging of relatively complex magnetic images in a non-moving system with only one magnetic imaging step. In the case of magnetic layers buried between or within overlying reflector layers as described hereafter for some pigment embodiments, the present invention presents a significant improvement over the prior art by achieving higher chroma and brightness. By putting the duller magnetic material inside the reflector, the present invention accomplishes two objectives: 1) the reflectivity of the reflector layer is maintained; and 2) color shifting pigments without the inner core of magnetic material cannot be distinguished by an observer from such pigment with the core of magnetic material. For example, two coated objects viewed side by side, one with and one without the magnetic material in the coating, would look the same to the observer. However, the magnetic color shifting pigment provides a covert security feature in addition to the color shifting effect. Thus, with a magnetic detection system, a magnetic covert signature in the pigment could be read by a Faraday rotator detector, for example.

Referring now to the drawings, wherein like structures are provided with like reference designations, FIG. 1 illustrates one embodiment of an imaged coating product 20 produced according to the present invention and having a three dimensional-like image. The coating product 20 includes a substrate 22, a magnetic printed image layer 24 applied over substrate 22, and a magnetizable pigment coating 26 applied over magnetic printed image layer 24. An area 28 represents the cross-sectional portion of the printed image layer 24 that contains a magnetic image. Each of these elements of imaged coating product 20 will be discussed in further detail hereafter.

The substrate 22 can be any suitable material such as paper, flexible polyethylene terephthalate (PET) web, carrier substrate, or other plastic material. The only requirements for substrate 22 are that it have sufficient rigidity to support printed image layer 24 and that it not interfere with the magnetism of the magnetic pigments.

The magnetic printed image layer 24 can be provided in a number of ways, such as by applying a magnetic ink or lacquer directly onto substrate 22 in the shape of the final image, by pre-printing the image on a carrier substrate with a release layer and subsequently transferring the image to substrate 22, or by pre-printing the image on a carrier substrate such as an optically transparent sheet and affixing the carrier substrate to substrate 22. A variety of printing methods can be used to produce image layer 24, including gravure, Intaglio, flexographic, silk-screen, hot stamp, spray, and lithographic printing.

The magnetism of image layer 24 can be provided by a variety of magnetic means for producing a magnetic field, including, but not limited to, permanent magnetic metal flakes or multilayer magnetic flakes containing permanent magnetic materials dispersed in an ink vehicle. The image layer 24 may inherently contain sufficient magnetism to effect the desired orientation change in magnetizable pigment coating 26, either by prior magnetic treatment or by use of permanent magnetic materials in image layer 24. Alternatively, image layer 24 may be subjected to an external magnetic field at some point prior to coating substrate 22 with pigment coating 26, thereby increasing the magnetic field exuded by image layer 24.

The magnetizable pigment coating 26 includes a plurality of magnetizable flakes or non-spherical particles suspended in a suitable pigment vehicle. The magnetizable flakes or particles preferably have an aspect ratio of at least about 2:1, and more preferably about 5–15:1, with a narrow particle size distribution such as about 20–50 $\mu$m. The aspect ratio of the flakes is ascertained by taking the ratio of the longest planar dimension of the opposing major surfaces to the edge thickness dimension of the flakes. As with the image layer 24, magnetizable pigment coating 26 can be applied by a variety of printing techniques, including gravure, Intaglio, flexographic, silk-screen, hot stamp, spray, and lithographic printing.

As illustrated in FIG. 1, the magnetizable pigment coating 26 includes a plurality of flakes 30 that are generally parallel to the surface of the coating, as well as a plurality of flakes 32 that are reoriented to be non-parallel, from obtuse to substantially normal, to a surface of the coating. The flakes 32 are reoriented by the magnetic field produced by the magnetic image in area 28 below flakes 32. This produces a three dimensional-like image on the surface of pigment coating 26 that corresponds to the underlying magnetic image in area 28.

A variety of pigment particles or flakes can be utilized in magnetizable pigment coating 26. For example, conventional noninterference magnetic pigments can be used such as monolithic metallic flakes with magnetic properties, including those made with iron, nickel, cobalt, alloys thereof, stainless steel, and the like. In addition, interference and non-interference multilayer thin film flakes that contain magnetic layers can also be used. For example, pigment flakes that have substantial shifts in chroma and hue with changes in the angle of incident light or viewing angle of an observer can be used. Such an optical effect, known as goniochromaticity, optical variability, or "color shift," allows a perceived color to vary with the angle of illumination or observation. Accordingly, such pigment flakes exhibit a first color at a first angle of incident light or viewing and a second color different from the first color at a second angle of incident light or viewing. The color shifting effects increase the three dimensional-like effects created by the imaged coating products of the present invention.

Generally, the color shifting pigment flakes useful in the invention can have a symmetrical stacked coating structure on opposing sides of a magnetic core layer, or can be formed with one or more encapsulating coatings which surround a magnetic core. The coating structure of color shifting flakes generally includes a reflector layer, a dielectric layer overlying the reflector layer, and an absorber layer overlying the dielectric layer.

The interference and non-interference multilayer thin film flakes that contain magnetic layers as used in the invention can be formed by various fabrication methods, as disclosed in further detail in a copending U.S. patent application Ser. No. 09/844,261, filed Apr. 27, 2001, and entitled Multi-Layered Magnetic Pigments And Foils, the disclosure of which is incorporated herein by reference. For example, the pigment flakes can be formed by a web coating process in which various layers are sequentially deposited on a web material by conventional deposition techniques to form a thin film structure, which is subsequently fractured and removed from the web, such as by use of a solvent, to form a plurality of thin film flakes. In another alternative fabrication method, magnetic particles can be coated in a sequential encapsulation process to form a plurality of pigment flakes or particles. Nonlimiting examples of thin film deposition techniques which can be used in form thin film pigment layers include physical vapor deposition (PVD), chemical vapor deposition (CVD), plasma enhanced (PE) variations thereof such as PECVD or downstream PECVD, sputtering, electrolysis deposition, and other like deposition methods that lead to the formation of discrete and uniform thin film layers.

Other conventional magnetic color shifting flake structures that are compatible with the methods of the invention are disclosed in Phillips '648 and in Schmid, both previously incorporated by reference. Further details of preferred novel pigments including color shifting pigments are discussed hereafter.

In a method of fabricating imaged coating product 20, magnetic printed image layer 24 is applied to substrate 22 by any of the above printing techniques. The magnetizable pigment coating 26 is then applied in liquid form over printed image layer 24. As discussed above, image layer 24 may inherently contain sufficient magnetism in the magnetic image in area 28 to effect the desired orientation change in the pigment flakes of pigment coating 26. Alternatively, image layer 24 may be subjected to an external magnetic force prior to applying pigment coating 26 to substrate 22. The magnetic field produced by image layer 24 is applied to selected regions of pigment coating 26 while the coating is in liquid form, with the magnetic field altering the orientation of selected pigment flakes. The pigment coating 26 is then solidified, affixing the reoriented flakes in a position that is non-parallel to the surface of the pigment coating. In order to ensure that the flakes are preserved in the reoriented position which produces the three dimensional-like image, the coating is preferably solidified by thermal processes such as thermal cross-linking, thermal setting, or thermal solvent evaporation, or by photochemical cross-linking.

It is an advantage of this method of the invention that it uses a static magnetic field that does not move relative to the substrate while the image in the pigment coating is formed. This approach leads to several benefits over conventional methods, including: 1) providing a higher resolution in the final coating image since the image is formed by the printed magnetic image area rather than by a diffuse magnetic force or an image formed by a diffuse magnetic force; and 2) the printed magnetic image area can be magnetized by a broad magnetic sweep rather than by a patterned or moving magnetic field.

Figure 2:
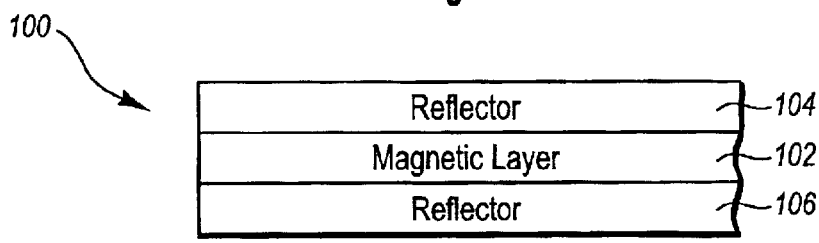
FIG. 2 is a schematic representation of the coating structure of a magnetic flake according to one embodiment of the invention.

FIG. 2 depicts a reflective magnetic flake ("RMF") 100, suitable for use in the magnetizable pigment coating, according to one embodiment of the invention. The RMF 100 is a three layer design having a generally symmetrical thin film structure with a central magnetic layer 102 and at least one reflector layer on either or both of the opposing major surfaces of the central magnetic layer. Thus, RMF 100 comprises a magnetic layer interdisposed between a first reflector layer 104 and an opposing second reflector layer 106. By inserting the magnetic layer between the highly reflective reflector layers, such as aluminum, the optical properties of the reflector layers are not degraded and the flake remains highly reflective. One suitable example of an RMF according to the invention has the coating structure: aluminum/magnetic core/aluminum.

The RMF 100 can be used as a pigment flake or can be used as a core section with additional layers applied thereover such as in a color shifting pigment. In the case of color shifting pigments, maintaining the high reflective layer is extremely important to preserve high brightness and chroma. Each of these layers in the coating structure of RMF 100 is discussed below in greater detail.

The magnetic layer 102 can be formed of any magnetic material such as nickel, cobalt, iron, gadolinium, terbium, dysprosium, erbium, and their alloys or oxides. For example, a cobalt nickel alloy can be employed, with the cobalt and nickel having a ratio by weight of about 80% and about 20%, respectively. This ratio for each of these metals in the cobalt nickel alloy can be varied by plus or minus about 10% and still achieve the desired results. Thus, cobalt can be present in the alloy in an amount from about 70% to about 90% by weight, and nickel can be present in the alloy in an amount from about 10% to about 30% by weight. Other examples of alloys include Fe/Si, Fe/Ni, FeCo, Fe/Ni/Mo, and combinations thereof. Hard magnetics of the type $SmCo_5$, $NdCo_5$, $Sm_2Co_{17}$, $Nd_2Fe_{14}B$, $Sr_6Fe_2O_3$, $TbFe_2$, Al—Ni—Co, and combinations thereof, can also be used as well as spinel ferrites of the type $Fe_3O_4$, $NiFe_2O_4$, $MnFe_2O_4$, $CoFe_2O_4$, or garnets of the type YIG or GdIG, and combinations thereof. The magnetic material may be selected for its reflecting or absorbing properties as well as its magnetic properties. When utilized to function as a reflector, the magnetic material is deposited to a thickness so that it is substantially opaque. When utilized as an absorber, the magnetic material is deposited to a thickness so that it is not substantially opaque.

Although this broad range of magnetic materials can be used, the "soft" magnets are preferred. As used herein, the term "soft magnets" refers to any material exhibiting ferromagnetic properties but having a remanence that is substantially zero after exposure to a magnetic force. Soft magnets show a quick response to an applied magnetic field, but retain very low (coercive fields (Hc)=0.05–300 Oersteds (Oe)) or zero magnetic signatures, or retain very low magnetic lines of force after the magnetic field is removed. Similarly, as used herein, the term "hard magnets" (also called permanent magnets) refers to any material that exhibits ferromagnetic properties and that has a long lasting remanence after exposure to a magnetizing force. A ferromagnetic material is any material that has a permeability substantially greater than 1 and that exhibits magnetic hysteresis properties.

Preferably, the magnetic materials used to form magnetic layers in the flakes and foils of the invention have a coercivity of less than about 2000 Oe, more preferably less than about 300 Oe. Coercivity refers to the ability of a material to be de-magnetized by an external magnetic field. The higher the value of coercivity, the higher the magnetic field required to de-magnetize the material after the field is removed. In some embodiments of the invention, the magnetic layers used are preferably "soft" magnetic materials, as opposed to traditional "hard" magnetic materials which have higher coercivities. The coercivities of the foils, pigments or colorants of the magnetic color shifting designs according to the invention are preferably in a range of about 50 Oe to about 300 Oe. These coercivities are lower than in standard recording materials. Thus, preferred embodiments of the invention which use soft magnets in magnetic color shifting pigments and magnetic non color shifting pigments are an improvement over conventional technologies.

The magnetic layer 102 can be formed to have a suitable physical thickness of from about 200 angstroms (Å) to about 10,000 Å, and preferably from about 500 Å to about 1,500 Å. However, it will be appreciated by those skilled in the art, in view of the disclosure herein, that the optimal magnetic thickness will vary depending on the particular magnetic material used and the purpose for its use. For example, a magnetic absorber layer can be thinner than a magnetic reflector layer based on the optical requirements for such layers, while a covert magnetic layer will have a thickness based solely on its magnetic properties.

The reflector layers 104 and 106 can be composed of various reflective materials. Presently preferred materials are one or more metals, one or more metal alloys, or combinations thereof, because of their high reflectivity and ease of use, although non-metallic reflective materials could also be used. Nonlimiting examples of suitable metallic materials for the reflector layers include aluminum, silver, copper, gold, platinum, tin, titanium, palladium, nickel, cobalt, rhodium, niobium, chromium, and combinations or alloys thereof. These can be selected based on the color effects desired. The reflector layers 104, 106 can be formed to have a suitable physical thickness of from about 400 Å to about 2,000 Å, and preferably from about 500 Å to about 1,000 Å.

In an alternative embodiment, opposing dielectric layers may optionally be added to overlie reflector layers 104 and 106. These opposing dielectric layers add durability, rigidity, and corrosion resistance to RMF 100.

Figure 3:
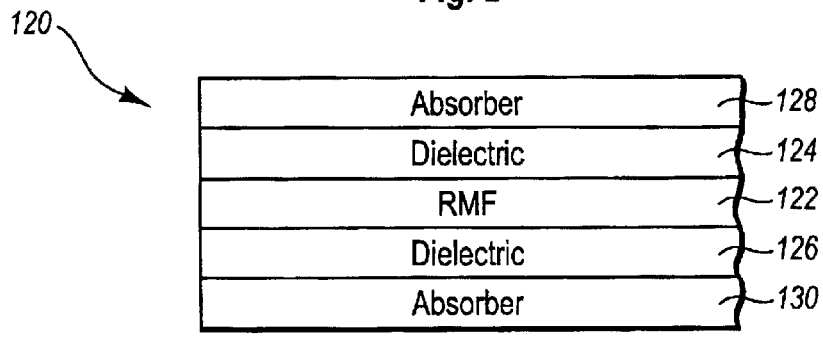
FIG. 3 is a schematic representation of the coating structure of a magnetic flake according to another embodiment of the invention.

FIG. 3 depicts a magnetic color shifting pigment flake 120 based upon a RMF according to one embodiment of the invention. The flake 120 is a generally symmetrical multilayer thin film structure having layers on opposing sides of a RMF 122. Thus, first and second dielectric layers 124 and 126 are disposed respectively on opposing sides of RMF 122, and first and second absorber layers 128 and 130 are disposed respectively on each of dielectric layers 124 and 126. The RMF is as discussed hereinabove while the dielectric and absorber layers are discussed below in greater detail.

The dielectric layers 124 and 126 act as spacers in the thin film stack structure of flake 120. These layers are formed to have an effective optical thickness for imparting interference color and desired color shifting properties. The dielectric layers may be optionally clear, or may be selectively absorbing so as to contribute to the color effect of a pigment. The optical thickness is a well known optical parameter defined as the product $\eta d$, where $\eta$ is the refractive index of the layer and d is the physical thickness of the layer. Typically, the optical thickness of a layer is expressed in terms of a quarter wave optical thickness (QWOT) that is equal to $4\eta d/\lambda$, where $\lambda$ is the wavelength at which a QWOT condition occurs. The optical thickness of dielectric layers can range from about 2 QWOT at a design wavelength of about 400 nm to about 9 QWOT at a design wavelength of about 700 nm, and preferably 2–6 QWOT at 400–700 nm, depending upon the color shift desired. The dielectric layers typically have a physical thickness of about 100 nm to about 800 nm, depending on the color characteristics desired.

Suitable materials for dielectric layers 124 and 126 include those having a "high" index of refraction, defined herein as greater than about 1.65, as well as those have a "low" index of refraction, which is defined herein as about 1.65 or less. Each of the dielectric layers can be formed of a single material or with a variety of material combinations and configurations. For example, the dielectric layers can be formed of only a low index material or only a high index material, a mixture or multiple sublayers of two or more low index materials, a mixture or multiple sublayers of two or more high index materials, or a mixture or multiple sublayers of low index and high index materials. In addition, the dielectric layers can be formed partially or entirely of high/low dielectric optical stacks, which are discussed in further detail below. When a dielectric layer is formed partially with a dielectric optical stack, the remaining portion of the dielectric layer can be formed with a single material or various material combinations and configurations as described above.

Examples of suitable high refractive index materials for the dielectric layer include zinc sulfide (ZnS), zinc oxide (ZnO), zirconium oxide ($ZrO_2$), titanium dioxide ($TiO_2$), diamond-like carbon, indium oxide ($In_2O_3$), indium-tin-oxide (ITO), tantalum pentoxide (Ta2O5), ceric oxide ($CeO_2$), yttrium oxide ($Y_2O_3$), europium oxide ($Eu_2O_3$), iron oxides such as (II)diiron(III) oxide ($Fe_3O_4$) and ferric oxide ($Fe_2O_3$), hafnium nitride (HfN), hafnium carbide (HfC), hafnium oxide ($HfO_2$), lanthanum oxide ($La_2O_3$), magnesium oxide (MgO), neodymium oxide ($Nd_2O_3$), praseodymium oxide ($Pr_6O_{11}$), samarium oxide ($Sm_2O_3$), antimony trioxide ($Sb_2O_3$), silicon monoxide (SiO), selenium trioxide ($Se_2O_3$), tin oxide ($SnO_2$), tungsten trioxide ($WO_3$), combinations thereof, and the like.

Suitable low refractive index materials for the dielectric layer include silicon dioxide ($SiO_2$), aluminum oxide ($Al_2O_3$), metal fluorides such as magnesium fluoride ($MgF_2$), aluminum fluoride ($AlF_3$), cerium fluoride ($CeF_3$), lanthanum fluoride ($LaF_3$), sodium aluminum fluorides (e.g., $Na_3AlF_6$ or $Na_5Al_3F_{14}$), neodymium fluoride ($NdF_3$), samarium fluoride ($SmF_3$), barium fluoride ($BaF_2$), calcium fluoride ($CaF_2$), lithium fluoride (LiF), combinations thereof, or any other low index material having an index of refraction of about 1.65 or less. For example, organic monomers and polymers can be utilized as low index materials, including dienes or alkenes such as acrylates (e.g., methacrylate), perfluoroalkenes, polytetrafluoroethylene (Teflon), fluorinated ethylene propylene (FEP), combinations thereof, and the like.

It should be appreciated that several of the above-listed dielectric materials are typically present in non-stoichiometric forms, often depending upon the specific method used to deposit the dielectric material as a coating layer, and that the above-listed compound names indicate the approximate stoichiometry. For example, silicon monoxide and silicon dioxide have nominal 1:1 and 1:2 silicon-:oxygen ratios, respectively, but the actual silicon:oxygen ratio of a particular dielectric coating layer varies somewhat from these nominal values. Such non-stoichiometric dielectric materials are also within the scope of the present invention.

As mentioned above, the dielectric layers can be formed of high/low dielectric optical stacks, which have alternating layers of low index (L) and high index (H) materials. When a dielectric layer is formed of a high/low dielectric stack, the color shift at angle will depend on the combined refractive index of the layers in the stack. Examples of suitable stack configurations for the dielectric layers include LH, HL, LHL, HLH, HLHL, LHLH, or in general $(LHL)^n$ or $(HLH)^n$, where n=100, as well as various multiples and combinations thereof. In these stacks, LH, for example, indicates discrete layers of a low index material and a high index material. In an alternative embodiment, the high/low dielectric stacks are formed with a gradient index of refraction. For example, the stack can be formed with layers having a graded index low-to-high, a graded index high-to-low, a graded index [low-to-high-to-low]$^n$, a graded index [high-to-low-to-high]$^n$, where n=1–100, as well as combinations and multiples thereof. The graded index is produced by a gradual variance in the refractive index, such as low-to-high index or high-to-low index, of adjacent layers. The graded index of the layers can be produced by changing gases during deposition or co-depositing two materials (e.g., L and H) in differing proportions. Various high/low optical stacks can be used to enhance color shifting performance, provide antireflective properties to the dielectric layer, and change the possible color space of the pigments of the invention.

The dielectric layers can each be composed of the same material or a different material, and can have the same or different optical or physical thickness for each layer. It will be appreciated that when the dielectric layers are composed of different materials or have different thicknesses, the flakes exhibit different colors on each side thereof and the resulting mix of flakes in a pigment or paint mixture would show a new color which is the combination of the two colors. The resulting color would be based on additive color theory of the two colors coming from the two sides of the flakes. In a multiplicity of flakes, the resulting color would be the additive sum of the two colors resulting from the random distribution of flakes having different sides oriented toward the observer.

The absorber layers 128, 130 of flake 120 can be composed of any absorber material having the desired absorption properties, including both selective absorbing materials and nonselective absorbing materials. For example, the absorber layers can be formed of nonselective absorbing metallic materials deposited to a thickness at which the absorber layer is at least partially absorbing, or semi-opaque. Non-limiting examples of suitable absorber materials include metallic absorbers such as chromium, aluminum, nickel, palladium, platinum, titanium, vanadium, cobalt, iron, tin, tungsten, molybdenum, rhodium, niobium, as well as other absorbers such as carbon, graphite, silicon, germanium, cermet, ferric oxide or other metal oxides, metals mixed in a dielectric matrix, and other substances that are capable of acting as a uniform or selective absorber in the visible spectrum. Various combinations, mixtures, compounds, or alloys of the above absorber materials may be used to form the absorber layers of flake 120.

Examples of suitable alloys of the above absorber materials include Inconel (Ni—Cr—Fe), stainless steels, Hastalloys (Ni—Mo—Fe; Ni—Mo—Fe—Cr; Ni—Si—Cu) and titanium-based alloys, such as titanium mixed with carbon (Ti/C), titanium mixed with tungsten (Ti/W), titanium mixed with niobium (Ti/Nb), and titanium mixed with silicon (Ti/Si), and combinations thereof. The absorber layers can also be composed of an absorbing metal oxide, metal sulfide, metal carbide, or combinations thereof. For example, one preferred absorbing sulfide material is silver sulfide. Other examples of suitable compounds for the absorber layers include titanium-based compounds such as titanium nitride (TiN), titanium oxynitride ($TiN_xO_y$), titanium carbide (TiC), titanium nitride carbide ($TiN_xC_z$), titanium oxynitride carbide ($TiN_xO_yC_z$), titanium silicide ($TiSi_2$), titanium boride ($TiB_2$), and combinations thereof. In the case of $TiN_xO_y$ and $TiN_xO_yC_z$, preferably x=0 to 1, y=0 to 1, and z=0 to 1, where x+y=1 in $TiN_xO_y$ and x+y+z=1 in $TiN_xO_yC_z$. For $TiN_xC_z$, preferably x=0 to 1 and z=0 to 1, where x+z=1. Alternatively, the absorber layers can be composed of a titanium-based alloy disposed in a matrix of Ti, or can be composed of Ti disposed in a matrix of a titanium-based alloy.

It will be appreciated by one skilled in the art that the absorber layer also could be formed of a magnetic material, such as a cobalt nickel alloy. This simplifies the manufacture of the magnetic color shifting device or structure by reducing the number of materials required.

The absorber layers are formed to have a physical thickness in the range from about 30 Å to about 500 Å, and preferably about 50 Å to about 150 Å, depending upon the optical constants of the absorber layer material and the desired peak shift. The absorber layers can each be composed of the same material or a different material, and can have the same or different physical thickness for each layer.

Figure 4:
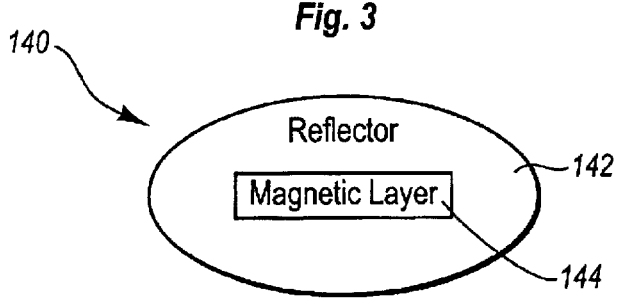
FIG. 4 is a schematic representation of the coating structure of a magnetic particle according to an alternative embodiment of the invention.

FIG. 4 depicts a reflective magnetic flake or particle ("RMP") 140 according to another embodiment of the invention. The RMP 140 is a two layer, non-spherical design with a reflector layer 142 substantially surrounding and encapsulating a core magnetic layer 144. By inserting the magnetic layer within the reflector layer, the optical properties of the reflector layer are not downgraded and the reflector layer remains highly reflective. The RMP 140 can be used as a pigment particle or can be used as a core section with additional layers applied thereover. The magnetic layer and reflector layer can be composed of the same materials discussed with respect to RMF 120. In an alternative embodiment, a dielectric layer may optionally be added to overlie reflector layer 142, to add durability, rigidity, and corrosion resistance to RMP 140.

Figure 5:
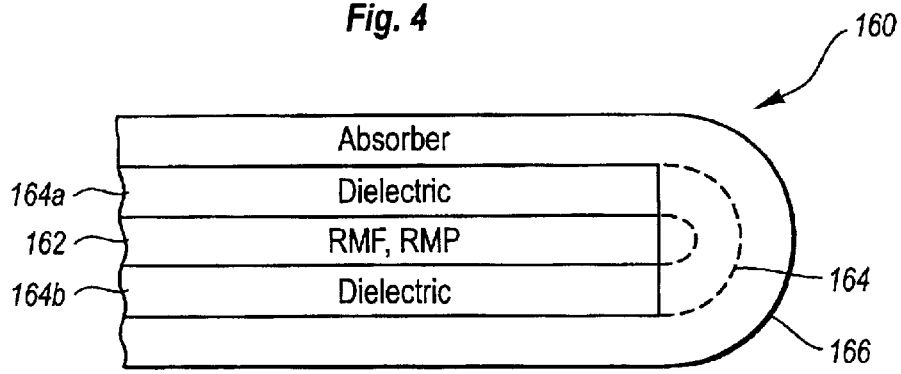
FIG. 5 is a schematic representation of the coating structure of a magnetic flake according to a further embodiment of the invention.

FIG. 5 depicts alternative coating structures (with phantom lines) for a magnetic color shifting pigment flake 160 in the form of an encapsulate based upon either the RMF or the RMP according to other embodiments of the invention. The flake 160 has a magnetic core section 162, which is either a RMF or a RMP, which can be overcoated by an encapsulating dielectric layer 164 substantially surrounding magnetic core section 162. An absorber layer 166, which overcoats dielectric layer 164, provides an outer encapsulation of flake 160. The hemispherical dashed lines on one side of flake 160 in FIG. 5 indicate that dielectric layer 164 and absorber layer 166 can be formed as contiguous layers around magnetic core section 162.

Alternatively, the magnetic core section 162 and dielectric layer can be in the form of a thin film core flake stack, in which opposing dielectric layers 164a and 164b are preformed on the top and bottom surfaces but not on at least one side surface of magnetic core section 162, with absorber layer 166 encapsulating the thin film stack. An encapsulation process can also be used to form additional layers on flake 160 such as a capping layer (not shown). The pigment flake 160 exhibits a discrete color shift such that the pigment flake has a first color at a first angle of incident light or viewing and a second color different from the first color at a second angle of incident light or viewing.

Figure 6:
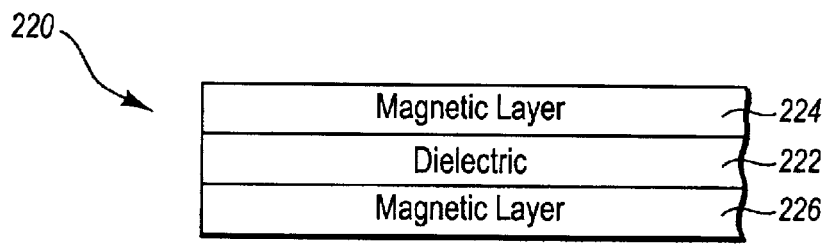
FIG. 6 is a schematic representation of the coating structure of a magnetic flake according to a further embodiment of the invention.

FIG. 6 depicts a composite magnetic flake ("CMF") 220 which comprises a central dielectric support layer 222 with first and second magnetic layers 224, 226 on opposing major surfaces thereof. By inserting the dielectric layer between the magnetic layers, the CMF 120 is significantly stabilized and strengthened, having increased rigidity. Additional dielectric layers (not shown) may optionally be added to overlie magnetic layers 224, 226. These additional dielectric layers add durability, rigidity, and resistance to corrosion to CMF 220. The CMF 220 can be used as a pigment flake by itself or can be used as a magnetic core section with additional layers applied thereover. The magnetic layers 224, 226 can be formed of any of the magnetic materials described previously.

The dielectric material used for support layer 222 is preferably inorganic, since inorganic dielectric materials have been found to have good characteristics of brittleness and rigidity. Various dielectric materials that can be utilized include metal fluorides, metal oxides, metal sulfides, metal nitrides, metal carbides, combinations thereof, and the like. The dielectric materials may be in either a crystalline, amorphous, or semicrystalline state. These materials are readily available and easily applied by physical or chemical vapor deposition processes. Examples of suitable dielectric materials include magnesium fluoride, silicon monoxide, silicon dioxide, aluminum oxide, titanium dioxide, tungsten oxide, aluminum nitride, boron nitride, boron carbide, tungsten carbide, titanium carbide, titanium nitride, silicon nitride, zinc sulfide, glass flakes, diamond-like-carbon, combinations thereof, and the like. Alternatively, support layer 222 may be composed of a preformed dielectric or ceramic preflake material having a high aspect ratio such as a natural platelet mineral (e.g., mica peroskovite or talc), or synthetic platelets formed from glass, alumina, silicon dioxide, carbon, micaeous iron oxide, coated mica, boron nitride, boron carbide, graphite, bismuth oxychloride, various combinations thereof, and the like.

In an alternative embodiment, instead of a dielectric support layer 222, various semiconductive and conductive materials having a sufficient ratio of tensile to compressive strength can function as a support layer. Examples of such materials include silicon, metal silicides, semiconductive compounds formed from any of the group III, IV, or V elements, metals having a body centered cubic crystal structure, cermet compositions or compounds, semiconductive glasses, various combinations thereof, and the like. It will be appreciated from the teachings herein, however, that any support material providing the functionality described herein and capable of acting as a rigid layer with glass-like qualities would be an acceptable substitute for one of these materials.

The thickness of support layer 222 can be in a range from about 10 nm to about 1,000 µm, preferably from about 50 nm to about 200 nm, although these ranges should not be taken as restrictive.

Figure 7:
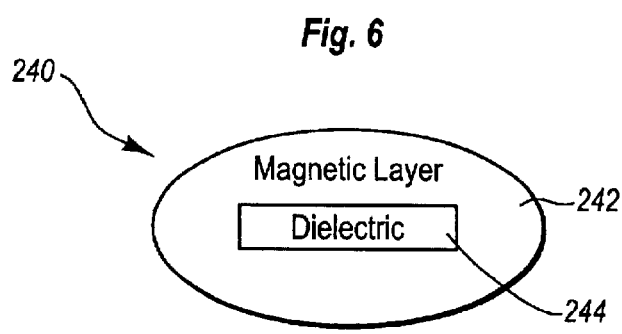
FIG. 7 is a schematic representation of the coating structure of a magnetic particle according to an alternative embodiment of the invention.

FIG. 7 depicts a composite magnetic particle ("CMP") 240 according to another embodiment of the invention. The CMP 240 is a two layer, non-spherical design with a magnetic layer 242 substantially surrounding and encapsulating a central support layer 244 such as a dielectric layer. By inserting the support layer within the magnetic layer, CMP 240 is significantly stabilized and rigid. The support layer adds rigidity and durability to the pigment flake. The magnetic layer 242 can be formed of any of the magnetic materials described previously. The support layer 244 can be formed of the same materials described hereinabove for support layer 222 of CMF 220. The CMP 240 can be used as a pigment particle by itself or can be used as a magnetic core section with additional layers applied thereover. For example, an outer dielectric layer may be added to overlie and encapsulate magnetic layer 242. This outer dielectric layer adds durability, rigidity, and corrosion resistance to CMP 240.

Figure 8:
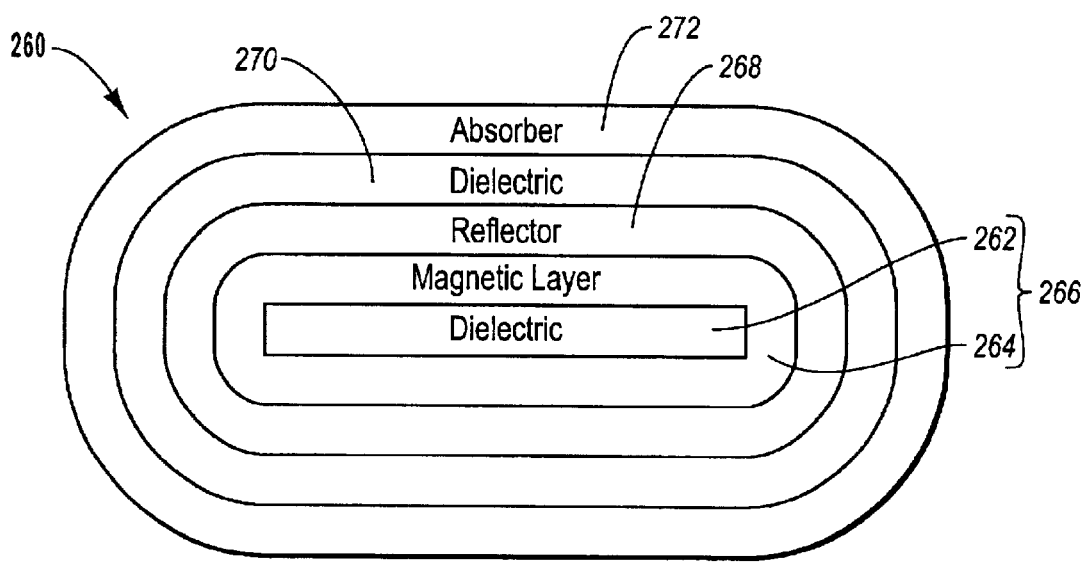
FIG. 8 is a schematic representation of the coating structure of a magnetic flake according to a further embodiment of the invention.

FIG. 8 depicts a coating structure for a color shifting pigment flake 260 in the form of an encapsulate. The flake 260 has a thin core layer 262, which can be formed of a dielectric or other material as taught hereinabove for support layer 222. The core layer 262 is overcoated on all sides with a magnetic layer 264, which can be composed of the same materials as described above for magnetic layer 102 of RMF 100. Optionally, a reflector layer 268 can be applied over magnetic layer 264. Suitable materials for reflector layer 268 include those materials described for reflector layer 104 of RMF 100. The reflector layer effectively provides the reflective function of flake 260, shielding magnetic layer 264 from being optically present. The core layer 262 and magnetic layer 264 can be provided as a CMP 266 which is overcoated with the other layers. Alternatively CMP 266 can be replaced with a CMF such as shown in FIG. 6. An encapsulating dielectric layer 270 substantially surrounds reflector layer 268 and magnetic layer 264. An absorber layer 272, which overlays dielectric layer 270, provides an outer encapsulation of flake 260.

Various coating processes can be utilized in forming the dielectric and absorber coating layers by encapsulation. For example, suitable preferred methods for forming the dielectric layer include vacuum vapor deposition, sol-gel hydrolysis, CVD in a fluidized bed, downstream plasma onto vibrating trays filled with particles, and electrochemical deposition. Suitable preferred methods for forming the absorber layers include vacuum vapor deposition, and sputtering onto a mechanically vibrating bed of particles, as disclosed in commonly assigned copending patent application Ser. No. 09/389,962, filed Sep. 3, 1999, entitled "Methods and Apparatus for Producing Enhanced Interference Pigments," which is incorporated herein by reference. Alternatively, the absorber coating may be deposited by decomposition through pyrolysis of metal-organo compounds or related CVD processes which may be carried out in a fluidized bed. If no further grinding is carried out, these methods result in an encapsulated core flake section with dielectric and absorber materials therearound. Various combinations of the above coating processes may be utilized during manufacture of pigment flakes with multiple encapsulating coatings.

Figure 9:
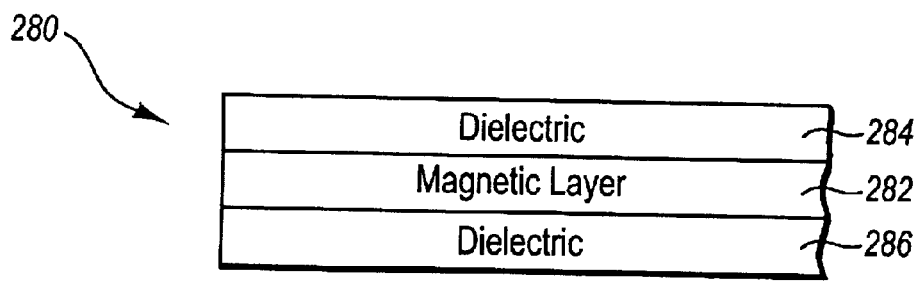
FIG. 9 is a schematic representation of the coating structure of a magnetic flake according to yet a further embodiment of the invention.

FIG. 9 depicts a dielectric coated magnetic flake ("DMF") 280 according to a further embodiment of the invention. The DMF 280 is a three layer design having a generally symmetrical thin film structure with a central magnetic layer and at least one dielectric layer on either or both of the opposing major surfaces of the central magnetic layer. Thus, as shown, DMF 280 includes a magnetic layer 282 sandwiched in between a dielectric layer 284 and an opposing dielectric layer 286. By inserting the magnetic layer between the dielectric layers, the DMF has increased rigidity and durability.

Figure 10:
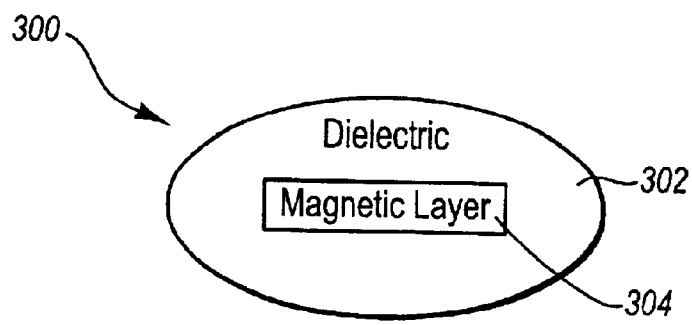
FIG. 10 is a schematic representation of the coating structure of a magnetic particle according to another alternative embodiment of the invention.

FIG. 10 depicts a dielectric coated magnetic particle ("DMP") 300 according to another embodiment of the invention. The DMP 300 is a two layer, non-spherical design with a dielectric layer 302 substantially surrounding and encapsulating a central magnetic layer 304.

Each of the layers in the coating structures of DMF 280 and DMP 300 can be formed of the same materials and thickness as corresponding layers described in previous embodiments. For example, the dielectric layer in DMF 280 and DMP 300 can be formed of the same materials and in the same thickness ranges as taught hereinabove for dielectric layer 124 of flake 120, and the magnetic layers in DMF 280 and DMP 300 can be formed of the same materials and in the same thickness ranges as taught hereinabove for magnetic layer 102 of RMF 100. The DMF 280 and DMP 300 can each be used as a pigment flake or particle, or can be used as a magnetic core section with additional layers applied thereover.

Figure 11:
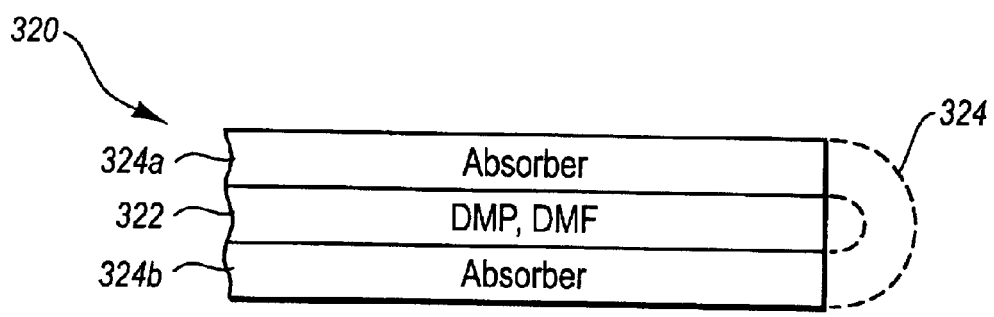
FIG. 11 is a schematic representation of the coating structure of a magnetic flake according to another embodiment of the invention.

FIG. 11 depicts a color shifting pigment flake 320 according to another embodiment of the invention which does not use a reflector. The flake 320 is a three-layer design having a generally symmetrical multilayer thin film structure on opposing sides of a magnetic core section 322, which can be a DMF or a DMP. Thus, first and second absorber layers 324a and 324b are formed on opposing major surfaces of magnetic core section 322. These layers of flake 320 can be formed by a web coating and flake removal process.

FIG. 11 further depicts an alternative coating structure (with phantom lines) for color shifting flake 320, in which the absorber layer is coated around magnetic core section 322 in an encapsulation process. Accordingly, absorber layers 324a and 324b are formed as part of a continuous coating layer 324 substantially surrounding the flake structure thereunder.

Thus, pigment flake 320 may be embodied either as a multilayer thin film stack flake or a multilayer thin film encapsulated particle. Suitable materials and thicknesses for the absorber, dielectric, and magnetic layers of flake 320 are the same as taught hereinabove.

Various modifications and combinations of the foregoing embodiments are also considered within the scope of the invention. For example, additional dielectric, absorber, and/or other optical coatings, as well as coatings with organic dyes or inorganic colorants, can be formed around each of the above flake or particle embodiments, or on a composite reflective film prior to flake formation, to yield further desired optical characteristics. Such additional coatings can provide additional color effects to the pigments. For example a colored dielectric coating added to a color shifting flake would act as a color filter on the flake, providing a subtractive color effect which changes the color produced by the flake.

Other pigment flake structures, methods of forming them, and additional features compatible therewith can be found in Phillips '648, U.S. Pat. No. 4,705,356 to Berning et al., and U.S. Pat. No. 6,157,489 to Bradley et al.; U.S. patent application Ser. Nos. 09/685,468 to Phillips et al, 09/715,937 to Coombs et al., 09/715,934 to Mayer et al., 09/389,962 to Phillips et al., and 09/539,695 to Phillips et al., the disclosures of which are each incorporated herein by reference. One skilled in the art will recognize, in light of the disclosure herein, that the magnetic layers discussed previously can be combined with the coating structures disclosed in the above patents and applications, such as by replacing a reflector layer with the RMF or RMP disclosed herein to obtain additional useful coating structures.

The pigment flakes and particles described above can be interspersed within a pigment medium to produce a magnetizable colorant composition which can be used as the pigment coating for producing the imaged coating products of the invention. Preferably, the pigment medium contains a resin or mixture of resins which can be dried or solidified by thermal processes such as thermal cross-linking, thermal setting, or thermal solvent evaporation or by photochemical cross-linking. Useful pigment media include various polymeric compositions or organic binders such as alkyd resins, polyester resins, acrylic resins, polyurethane resins, vinyl resins, epoxies, styrenes, and the like. Suitable examples of these resins include melamine, acrylates such as methyl methacrylate, ABS resins, ink and paint formulations based on alkyd resins, and various mixtures thereof.

The pigment medium also preferably contains a solvent for the resin. For the solvent, generally, either an organic solvent or water can be used. A volatile solvent can also be used in the medium. As for the volatile solvent, it is preferable to use a solvent which is both volatile as well as dilutable, such as a thinner. In particular, faster drying of the pigment medium can be achieved by increasing the amount of the solvent with a low boiling point composition such as methyl ethyl ketone (MEK).

Preferably, the pigment medium contains a resin or mixture of resins which can be dried or hardened by reaction at room temperature. When the pigment medium is one which can be hardened by heating, it is necessary to heat the coated product after the magnetic flakes are fixed within the coating layer, by the application of heat, for example, from a heated air blower or infrared radiation.

In a preferred embodiment, the pigment medium is one which can be hardened by ultraviolet radiation, such as a UV curable resin. A coating with such a resin can be solidified by using, for example, a mercury lamp.

In addition, the flakes and particles used in the pigment coating can be optionally blended with various additive materials such as other conventional pigment flakes, particles, or dyes of different hues, chroma and brightness to achieve the color characteristics desired. For example, the flakes can be mixed with other conventional pigments, either of the interference type or noninterference type, to produce a range of other colors. This preblended composition can then be dispersed into a polymeric medium such as a paint or ink or other polymeric pigment vehicle for use in accordance with the presently disclosed methods.

Examples of suitable additive materials that can be combined with the flakes of the invention include non-color shifting high chroma or high reflective platelets which produce unique color effects, such as $MgF_2/Al/MgF_2$ platelets or $SiO_2/Al/SiO_2$ platelets. Other suitable additives that can be mixed with the magnetic color shifting flakes include lamellar pigments such as multi-layer color shifting flakes, aluminum flakes, graphite flakes, glass flakes, iron oxide, boron nitride, mica flakes, interference based $TiO_2$ coated mica flakes, interference pigments based on multiple coated plate-like silicatic substrates, metal-dielectric or all-dielectric interference pigments, and the like; and non-lamellar pigments such as aluminum powder, carbon black, ultramarine blue, cobalt based pigments, organic pigments or dyes, rutile or spinel based inorganic pigments, naturally occurring pigments, inorganic pigments such as titanium dioxide, talc, china clay, and the like; as well as various mixtures thereof. For example, pigments such as aluminum powder or carbon black can be added to control lightness and other color properties.

Figure 12:
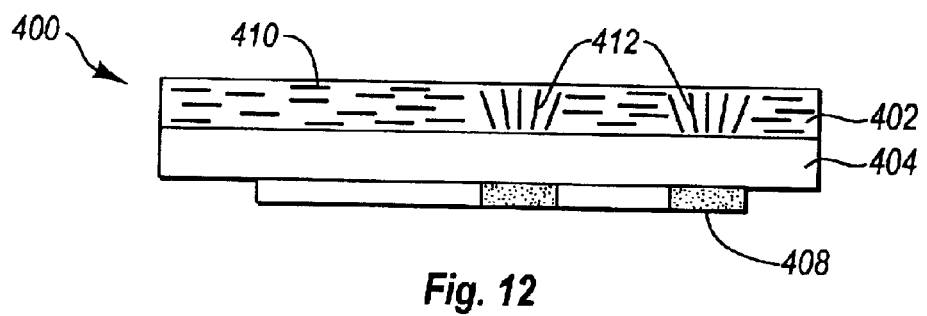
FIG. 12 is a cross-sectional schematic representation of an imaged coating product according to another embodiment of the invention.
Figure 13:
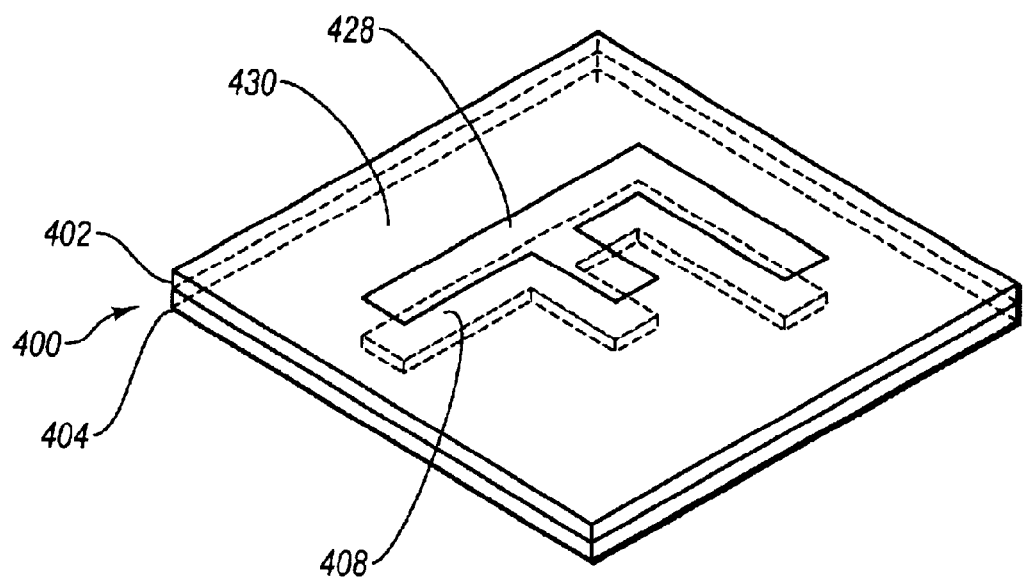
FIG. 13 is a schematic perspective view of the imaged coating product of FIG. 12.

Referring now to FIGS. 12 and 13, another embodiment of an imaged coating product 400 is depicted having a three dimensional-like image. The coating product 400 includes a magnetizable pigment coating 402 applied over a substrate 404. The pigment coating 402 and substrate 404 can be composed of the same materials as described for the corresponding structures in imaged coating product 20. The magnetizable pigment coating 402 includes a plurality of flakes 410 that are generally parallel to a surface 430 of the coating, as well as a plurality of flakes 412 that are reoriented to be non-parallel, from obtuse to substantially normal, to surface 430 of the coating. The flakes 412 are reoriented by the magnetic field produced by a sheet magnet 408 positioned below substrate 404. This produces a three dimensional-like image 428, such as in the shape of the letter "F" as shown, on the surface of pigment coating 402 that corresponds to the shape of sheet magnet 408 underlying substrate 404. It should be understood that a variety of images may be produced on the surface of the coating depending on the shape of the underlying magnet.

When the imaged coating product 400 is produced using a magnetizable coating containing color shifting pigments, such as described hereinabove, surface 430 has a color shifting effect, while image 428 when viewed from a normal position appears black. The image 428 regains its normal color effect, however, as the angle of viewing shifts from normal so that the lateral surfaces of the flakes can be seen by an observer. When the imaged coating product 400 is produced using a magnetizable coating containing a non-color shifting structure, such as Al/Fe/Al, surface 430 will be silver in color from the exposed aluminum layers, while image 428 will appear black due to the normal oriented flakes.

In a method of fabricating imaged coating product 400, magnetizable pigment coating 402 is applied in liquid form to substrate 404 by any suitable coating technique. A sheet magnet configured in the shape of the desired image, such as magnet 408, is then placed under substrate 404 opposite pigment coating 402 still in liquid form. The magnetic field surrounding the sheet magnet will orient the magnetic flakes in pigment coating 402 as described previously to form a three dimensional-like image on a surface of pigment coating 402 corresponding to the shape of the magnet. The pigment coating 402 is then solidified, affixing the reoriented flakes in a position that is non-parallel to the surface of the pigment coating. In order to ensure that the flakes are preserved in the reoriented position, the pigment coating is preferably solidified while being exposed to the magnetic field from the magnet. As with the method described with respect to FIG. 1, this method provides a relatively high resolution image because it only requires one imaging step.

The sheet magnet 408 is just one example of a means for producing a magnetic field which can be used to produce imaged coating product 400. Other suitable means for producing a magnetic field which can be used in place of sheet magnet 408 include a magnetic cathode used for DC magnetron sputtering, a magnetizable die which can be selectively magnetized by a secondary magnetic source, multiple magnetic poles (N–S) oriented together to from an image below the substrate, and various electromagnets positioned in different configurations.

In using a magnetic cathode, the image is created by placing the cathode under a substrate while the lacquer containing the magnetic optically variable pigment is still in the liquid state on top of the substrate. The arrangement of the magnets are such that the north/south poles of the permanent magnets are arranged to produce a field in an oval track.

In using a magnetizable die, for example, an iron die with the cutout or relief of an image on one surface thereof can be placed with the cutout or relief image of the die adjacent the substrate. When the die is exposed to a magnetic field focused on the die, the die transfers the magnetic field to the magnetizable pigment coating. In the case of a cutout die, such as a block numeral, the three-dimensional like image will be created in the magnetizable pigment in those locations above the die. In the case of a relief surface on the die, such as a face, a relief three dimensional-like image will be created, wherein the degree of magnetizable flake orientation can be controlled by: 1) controlling the magnetic field focused on the die; and 2) controlling the depth of the die relief. Use of a magnetizable die is particularly advantageous because it provides both on/off control and magnetic field magnitude control. In the various means for producing a magnetic field discussed previously, the magnetic field produced has various lines of magnetic force oriented to be substantially parallel to the coated surface at certain regions, and various other lines of magnetic force oriented to be substantially perpendicular to the coated surface at other regions. At areas in between the regions of substantially parallel magnetic lines and substantially perpendicular magnetic lines, the lines of magnetic force are angled. As a result, there is a gradual shift between the imaged pattern on the coated surface, and the non-imaged surface of the coated surface because the magnetic flakes are oriented with the magnetic lines in their location. The smooth transition in the flake orientation creates a gradual shift from the image to the non-imaged coated surface. This result enhances both color shifting effects and three dimensional effects.

A further discussion of magnetic forces, as well as other techniques for producing a magnetic field, including various magnetic configurations compatible with the present invention, are described in U.S. Pat. Nos. 5,364,689 and 5,630,877 to Kashiwagi, the disclosures of which are incorporated herein by reference.

Figure 14A:
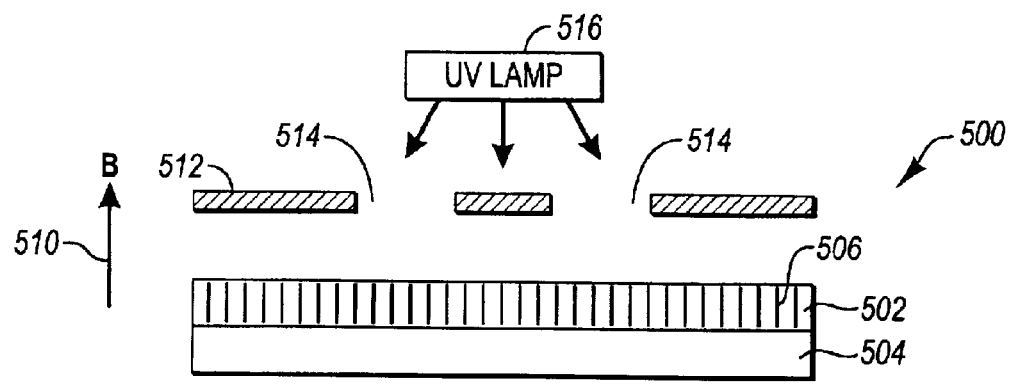
FIGS. 14a and 14b are schematic depictions of successive steps in a method for multicolor printing using magnetic pigments according to the invention.
Figure 14B:
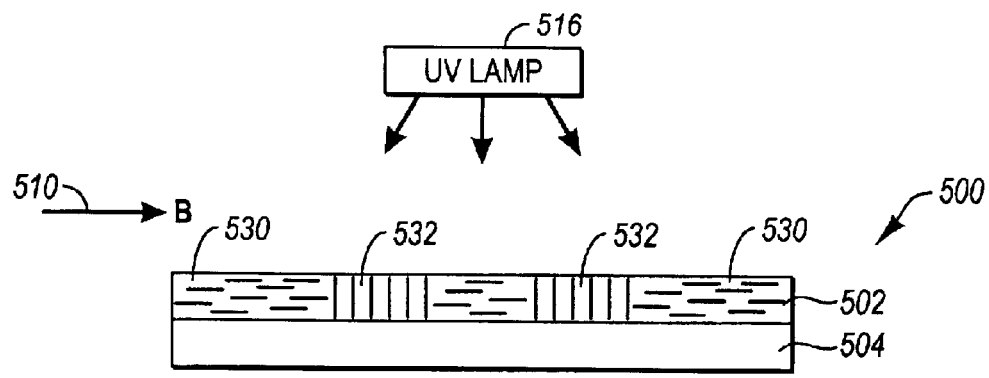

Referring to FIGS. 14a and 14b, the successive steps in a method for multicolor printing using magnetic pigments is depicted according to another aspect of the present invention. This method takes advantage of the fact that pigment flakes remain mobile in a liquid medium until the medium is hardened. Therefore, various regions of a pigment coating can be selectively hardened at different times and in different orientations.

As illustrated in FIG. 14a, a printed or coated article 500 is produced by initially applying a magnetizable pigment coating 502 to a substrate 504. The pigment coating 502 containing a plurality of magnetizable flakes 506 suspended in a lacquer or liquid resin that can be selectively cured by exposure to electromagnetic radiation, such as a UV curable resin. A magnetic field 510 is provided by any of the suitable magnetic field producing means disclosed hereinabove or known in the art. As illustrated, the magnetizable flakes align with the magnetic field lines so as to be substantially normal to the surface of pigment coating 502. A photomask 512 with voids 514 therein is positioned over pigment coating 502. The voids 514 are formed in photomask 512 so as to produce a corresponding desired pattern in article 500. When flakes 506 have been oriented inline with the magnetic field lines, pigment coating 502 is exposed to electromagnetic radiation, such as ultraviolet light from a UV lamp 516, through voids 514 in photomask 512. Because of photomask 512, only the exposed regions of pigment coating 502 below voids 514 are hardened, affixing flakes 506 in those regions in the desired orientation.

Referring now to FIG. 14b, magnetic field 510 is changed so that the magnetic field lines are reoriented, such as substantially parallel to the surface of pigment coating 502, or the magnetic field is removed altogether. The flakes present in unhardened regions of pigment coating 502 are reoriented along the magnetic field lines, such as reoriented to be substantially parallel to the surface of pigment coating 502. After the photomask is removed, electromagnetic radiation is again applied to the surface of pigment coating 502, affixing the remaining reoriented magnetic flakes in position within the hardened resin. Thus, selected flakes are affixed in a normal position in a first region 532 while other flakes are affixed in a parallel position in a second region 530, creating a pattern in article 500. Advantageously, the pattern width corresponds to the width defined by the voids in the photomask. This allows for higher resolution imaging than can be obtained by use of patterned magnetic fields. Another advantage of this method is that it can use a fixed magnetic field to form the patterned images, rather than a variable magnetic field as is otherwise required.

Figure 15A:
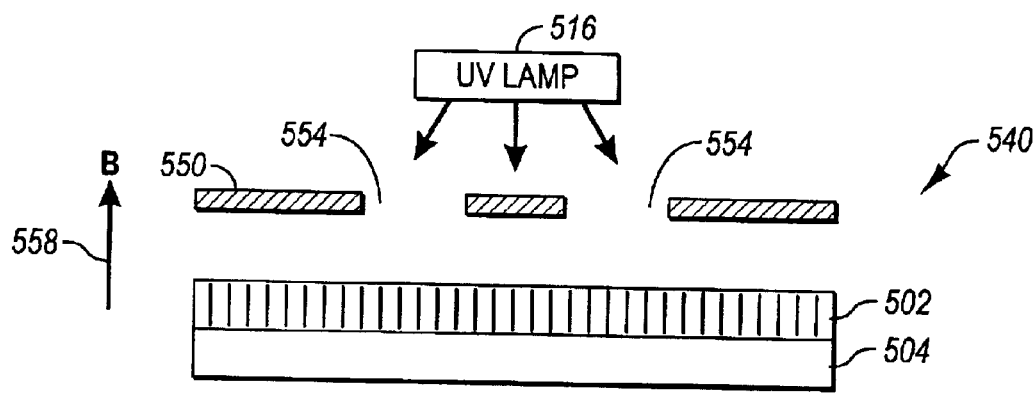
FIGS. 15a–15c are schematic depictions of successive steps in another method for multicolor printing using magnetic pigments according to the invention.
Figure 15B:
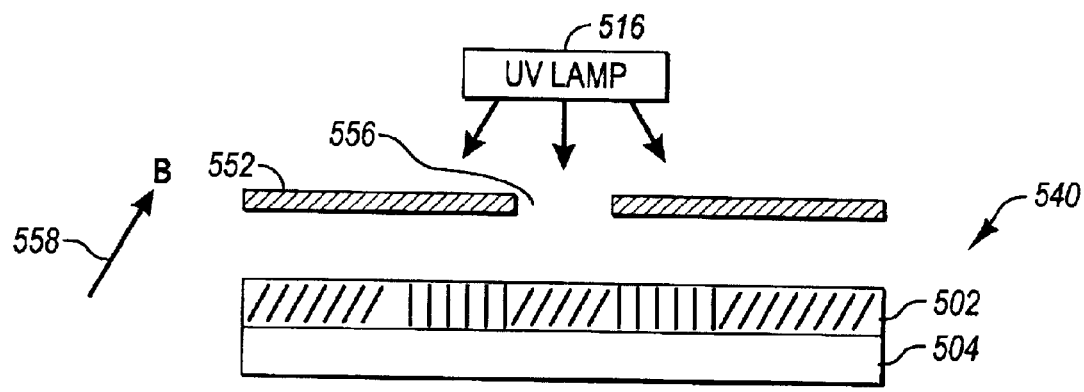
Figure 15C:
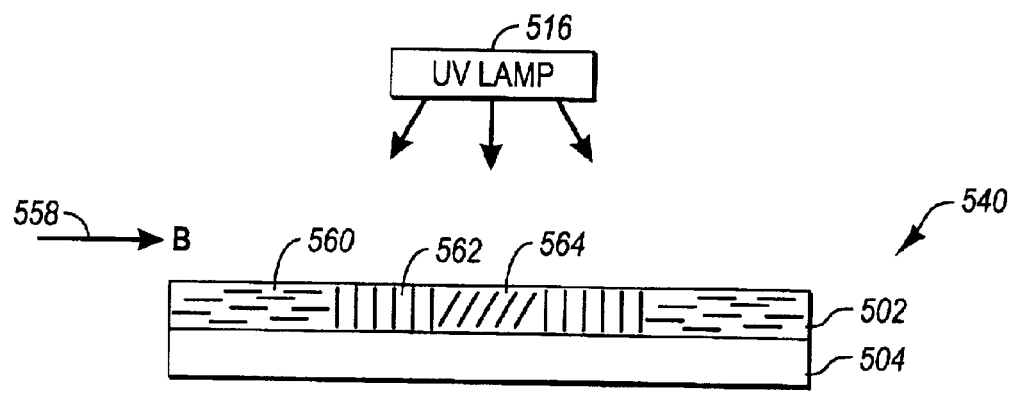

Referring now to FIGS. 15a–15c, the successive steps in another method for multicolor printing using magnetic pigments is depicted, which is a variation of the method shown in FIGS. 14a–14b. As illustrated in FIG. 15a, a printed or coated article 540 is produced by initially applying a magnetizable pigment coating 502 to a substrate 504. A photomask 550 with voids 554 therein is positioned over pigment coating 502. A magnetic field 558 is provided so that the magnetizable flakes align with the magnetic field lines so as to be substantially normal to the surface of pigment coating 502. The pigment coating 502 is then exposed to electromagnetic radiation, such as from a UV lamp 516, through voids 554 in photomask 550. The exposed regions of pigment coating 502 below voids 514 are thus hardened, affixing the flakes in the normal position.

As shown in FIG. 15b, a different photomask 552 is then positioned over pigment coating 502, with photomask 552 having a differing void pattern 556. The magnetic field 558 is then adjusted so as to reorient the magnetic field lines to an intermediate position, thereby reorienting the magnetizable flakes to an intermediate position, such as at an obtuse angle to the surface of the pigment coating. The pigment coating 502 is then exposed to UV lamp 516 through void 556 in photomask 552 to harden the exposed regions of pigment coating 502, thus affixing the flakes therein at the intermediate position.

In the last step shown in FIG. 15c, magnetic field 558 is changed so that the magnetic field lines are reoriented to be substantially parallel to the surface of pigment coating 502. The flakes present in unhardened regions of pigment coating 502 are correspondingly reoriented along the magnetic field lines to be substantially parallel to the surface of pigment coating 502. The pigment coating 502 is again exposed to UV lamp 516, affixing the remaining reoriented magnetic flakes in a parallel position within the hardened coating. Thus, the final product of coated article 540 includes flakes in three clearly defined regions 560, 562, and 564, with each region having flakes with distinct orientations. Of course, one skilled in the art will recognize that the final hardening of the coating can be performed by heat or by allowing the coating to dry, so long as the flakes in the unhardened regions are maintained in the reoriented position throughout the hardening.

In the method shown in FIGS. 15a–15c, the sequential steps involving distinct photomasks and distinctly oriented magnetic field lines allow a variety of permanent flake orientations to be used. This enables the formation of more complex patterns on printed or coated articles. This method is particularly advantageous when using color shifting magnetic pigments, since when viewed from a position normal to the surface of a coated article, a variety of colors can be presented to the observer. This results from flakes in the normal position in the pigment coating appearing black, flakes in the parallel position providing a first color, and flakes in the intermediate position providing a second color. These flakes will also change color as the angle of viewing changes, providing additional color effects to the surface of the coated article.

The methods shown in FIGS. 14a–14b and 15a–15c can be used to create printed or coated articles with three dimensional-like images, machine readable magnetic printing, advanced security labeling, enhanced optical effects, and image patterns having narrow line widths. It should be understood that these methods can be modified to include the use of additional photomasks and different magnetic fields as desired to create a variety of patterns and images on coated articles.

In another aspect of the present invention, a method is provided for applying identical or similar magnetic patterns to many articles simultaneously. Such a method can be used to apply magnetic patterns in a plurality of substrate surfaces, the surfaces being either a plurality of surface regions on a single substrate or a plurality of surfaces on multiple substrates. An example of such substrate surfaces is a sheet of banknotes. In conventional techniques, magnetically-induced patterns are created on individual substrates or articles. One cannot simply replicate the magnetic apparatus that is suited for a single article into a matrix of apparati intended to operate on a number of articles in close proximity. Creating a matrix or grid places adjacent apparati such that the magnetic fixtures are so close together that magnetic fields from one apparatus interfere with surrounding apparati. The present method utilizes magnetic shielding materials to block interference between magnetic field generating devices. The magnetic devices are designed so that each device maximizes the ability to align flakes in each individual image while minimizing leakage to other images. Such leakage tends to reduce image resolution and is important to avoid.

The method described herein can be readily adapted to commercial silk screen printing presses.

This method comprises first providing a plurality of substrate surfaces, the surfaces formed either as a plurality of surface regions on a single substrate or as a plurality of surfaces on multiple substrates. Next, a magnetic printed image can be applied to each substrate surface. Alternatively, an external magnetic field providing device can be provided, as disclosed hereinabove. Over the substrate surface or over each magnetic printed image is applied a liquid magnetizable pigment coating. The pigment coatings can include a plurality of non-spherical magnetic pigments dispersed in a pigment vehicle, as described hereinabove. The magnetic field providing devices and/or the substrate surfaces are shielded from one another by providing magnetic shielding materials to block magnetic interference. The pigment coatings are then exposed to the magnetic fields of either the magnetic printed images or the external magnetic field providing devices, whereby selected flakes in the pigment coatings are reoriented to a non-parallel or intermediate position with respect to a surface of the pigment coatings by the magnetic field. Finally, the pigments coatings are solidified to affix the selected flakes in the non-parallel or intermediate positions to produce images on the surface of the pigment coatings.

The following examples are given to illustrate the present invention, and are not intended to limit the scope of the invention.

EXAMPLE 1

A three layer magnetic coating sample was prepared with 1000 Å Aluminum, 1000 Å Iron, and 1000 Å Aluminum (Al/Fe/Al). The coating sample was prepared in a roll coater, using a 2 mil polyester web coated with an organic release layer (soluble in acetone). After stripping the three layer coating from the web to form pigment flake particles, the particles were filtered and sized by exposing the particles in isopropyl alcohol to ultrasonic agitation for 5 minutes using a Branson sonic welder. Particle size was determined using a Horiba LA-300 particle sizing instrument (laser scattering based system). The mean particle size was determined to be 44 $\mu$m (22 $\mu$m standard deviation) in the planar dimension, with a gaussian distribution. Following the sizing, the pigment particles were filtered and dried.

A dry weight of magnetic pigment to binder (DuPont auto refinish paint vehicle) in the ratio of 1:4 was drawn down onto a thin cardboard sheet (Leneta card). A "draw-down" is a paint or ink sample spread on paper to evaluate the color. Typically, a draw-down is formed with the edge of a putty knife or spatula by "drawing down" a small glob of paint or ink to get a thin film of the paint or ink. Alternatively, the draw-down is made using a Mayer rod pulled across a Leneta card and through a small glob of paint. A conventional sheet magnet was placed underneath the card while the drawing down was occurring and left in place until the paint vehicle dried. The result of the magnetic fields on this pigment sample was to create parallel bright and dark areas in the pigment. By using an ultra small area viewer (USAV, 2.3 mm) on a SF-600 DataColor spectrophotometer, the bright aluminum areas of the pigment sample had a reflective luminance, Y, of 53% whereas the dark areas had a reflective luminance of 43%. However, it was difficult to fit the aperture within the dark and bright lines suggesting that the difference in brightness may actually be larger than these measurements.

EXAMPLE 2

A magnetic ink sample was prepared by mixing a 0.5 g sample of the magnetic pigment of Example 1 (Al/Fe/Al) with 3.575 g of standard Intaglio ink vehicle (high viscosity ink vehicle) and 0.175 g of an ink dryer. The ink sample was drawn down onto paper using a flat putty knife. A magnetic strip with the word "FLEX" cut out from it was placed beneath the paper during the drawing down step. The pattern of the magnetic lines in the dried magnetic ink was readily visible as black and white (silver color) strips with the word "FLEX" readily apparent. The optical image of the word "FLEX" in the ink sample was visible at normal incidence and at approximately a 45 degree angle of viewing.

EXAMPLE 3

A magnetic ink sample was prepared as in Example 2 using an Intaglio ink vehicle and coated over paper having a sheet magnet placed behind it. The magnet had a cut out of a stylized letter "F." In addition to the magnetic pigment (Al/Fe/Al) orienting along the magnetic field lines, the cut out "F" was embossed upward away from the paper and was bright silver in appearance. The "F" stood out over the surrounding area by about 6 microns. This was caused by the paper pushed slightly into the "F" recess of the magnet by the force of the putty knife drawing down the highly viscous Intaglio ink. After the paper relaxed, the "F" area remained bright with the Al/Fe/Al flakes oriented parallel to the surface of the paper but in a stepped-up height above the surrounding coating.

EXAMPLE 4

A stylized letter "F" was cut out of a flexible sheet magnet using an exacto knife. A draw-down card was placed on top of and in contact with the sheet magnet. A magnetic color shifting pigment according to the invention was mixed with an acrylic resin based vehicle and applied to the card with a #22 wire mayer rod. The resultant draw-down had striped superimposed black lines that replicated the field pattern outside of the stylized "F" in the sheet magnet below the card. The entire surface of the drawn-down card exhibited color shifting effects. Where the pattern of the stylized "F" was observed, the stylized "F" only had color shifting effects, while the background had both color shifting effects and the superimposed black lines.

The cut out stylized letter "F" pieces from the sheet magnet were used in another draw-down with the same magnetic pigment and vehicle described previously in this example. The resultant draw-down had striped superimposed black lines that replicated the field pattern within the cutout stylized "F" magnet pieces. The entire surface of the drawn-down exhibited a color shifting effect. Where the pattern of the stylized "F" was observed, the stylized "F" had both color shifting effects and the superimposed black lines, while the background had only color shifting effects. Thus, in both instances the entire surface of the draw-down cards exhibited color shifting effects, while the areas directly above the magnets additionally had superimposed striped black lines due to the magnetic field pattern.

EXAMPLE 5

A magnetic color shifting pigment was prepared with the structure:

$Cr/MgF_2/Ni/MgF_2/Cr$

The $MgF_2$ layers were 4 QW at 530 nm and the Ni layer was applied to an opaque thickness. The pigment was mixed with an organic binder (Union Carbide acrylic resin) to form a paint composition. The paint was "drawn-down" over a 10 mil PET substrate and a magnetic cathode used for DC magnetron sputtering was placed underneath the substrate. The paint composition was 1 part (wt) pigment to 5 parts (wt) of organic binder. It was readily apparent that a color shifting three dimensional-like image was created that appeared to move as the viewing angle changed. In some areas of the pigment dispersion, the pigment was oriented flat (bright magenta halo seen in viewing at normal) whereas other areas were dark due to the orientation of the flakes perpendicular to normal. At an angle of view, three colors were noted: black, green, and magenta. The black or dark areas corresponded to pigments oriented "on-edge" (normal) to the observer. The magenta areas corresponded to pigments oriented flat (planar surfaces) toward the observer. The green areas corresponded to pigments oriented with their planar surfaces at an angle to the observer.

EXAMPLES 6–22

The magnetic properties of coercivity, saturation, remenance, and squareness of various coatings structures in foils, powders, and draw-downs were determined as set forth in Table 1. All of these coating structures are suitable for forming imaged coating products according to the invention. In each case, the coercivity was less than 300 Oe. Coercivity refers to the ability of a material to be de-magnetized by an external magnetic field. The higher the value of coercivity, the higher the magnetic field required to de-magnetize the material. Saturation is the condition under which induction of a ferromagnetic material has reached its maximum value with the increase of applied magnetizing force. At the saturation point all elementary magnetic moments have become oriented in one direction. Saturation is measured in gauss. Remenance (Bd) is the magnetic induction which remains in a magnetic material after the removal of an applied magnetizing force. Squareness is the ratio of the residual induction to the saturation induction of a magnetic material.

TABLE 1

| Example # | Structure | Design | Max. Field | Coercivity | Saturation | Remenance | Squareness |
|---|---|---|---|---|---|---|---|
| 6 | Foil | Ni/MgF2/Ni/MgF2/Ni | 1998 | 180 | 4705 | 2555 | 0.54 |
| 7 | Foil | Cr/MgF2/Ni/MgF2/Cr | 1998 | 188 | 4058 | 2523 | 0.62 |
| 8 | Foil | CoNi-100 Å | 1998 | 146 | 9840 | 7340 | 0.75 |
| 9 | Foil | CoNi-200 Å | 1998 | 111 | 11140 | 9097 | 0.82 |
| 10 | Foil | CoNi/MgF2/CoNi/MgF2/CoNi | 2003 | 92 | 6787 | 5064 | 0.75 |
| 11 | Foil | Ni/MgF2/Ni | 1998 | 152 | 6908 | 4162 | 0.60 |
| 12 | Powder | Ni/MgF2/Ni/MgF2/Ni | 1998 | 135 | 62.4 | 34.61 | 0.55 |
| 13 | Powder | Cr/MgF2/Ni/MgF2/Cr | 1998 | 83 | 40.07 | 18.94 | 0.47 |
| 14 | Powder | Ni/MgF2/Ni/MgF2/Ni | 2003 | 70 | 35.29 | 15.41 | 0.44 |
| 15 | Powder | Cr/MgF2/Ni/MgF2/Cr | 2003 | 74 | 19.64 | 8.29 | 0.42 |
| 16 | Powder | Ni/MgF2/Ni | 1998 | 106 | 93.37 | 41.43 | 0.44 |
| 17 | Draw-down | Ni/MgF2/Ni/MgF2/Ni | 2003 | 138 | 1762 | 1082 | 0.61 |
| 18 | Draw-down | Cr/MgF2/Ni/MgF2/Cr | 1998 | 90 | 1516 | 899 | 0.59 |
| 19 | Draw-down | Cr/MgF2/Ni/MgF2/Cr | 1998 | 72 | 895 | 529 | 0.59 |
| 20 | Draw-down | Cr/ZnS/CoNi/ZnS/Cr | 1998 | 271 | 9575 | 6595 | 0.69 |

TABLE 1-continued

| Example # | Structure | Design | Max. Field | Coercivity | Saturation | Remenance | Squareness |
|---|---|---|---|---|---|---|---|
| 21 | Draw-down | Ni/MgF2/Ni/MgF2/Ni | 1998 | 55 | 601 | 382 | 0.64 |
| 22 | Draw-down | Ni/MgF2/Ni | 1998 | 105 | 2262 | 1280 | 0.57 |

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A coated article with an image thereon, the article comprising:
   a substrate;
   a magnetic layer formed as an image overlying the substrate, said magnetic layer forming a magnetic field corresponding to said image; and
   a pigment coating overlying the magnetic image,
      said pigment coating including a plurality of non-spherical magnetic pigments having different optical characteristics based upon the angle of view oriented in a non-parallel position with respect to a surface of the pigment coating due to the effect of the magnetic field from the magnetic image, such that the pigment coating exhibits an image corresponding to the magnetic field of the magnetic layer.

2. The article of claim 1, wherein the magnetic pigments have an aspect ratio of at least about 2:1.

3. The article of claim 1, wherein the magnetic pigments have a multilayer coating structure with at least one layer in the multilayer coating structure comprising a soft magnetic material.

4. The article of claim 1, wherein the magnetic pigments include multilayer pigments with a coating structure comprising:
   a central magnetic layer having a first major surface, and an opposing second major surface;
   a first reflector layer on the first major surface of the magnetic layer; and
   a second reflector layer on the second major surface of the magnetic layer.

5. The article of claim 4, wherein the first and second reflector layers form a contiguous reflecting layer substantially surrounding the magnetic layer.

6. The article of claim 1, wherein the magnetic pigments include color shifting multilayer pigments with a coating structure comprising:
   a magnetic core section including:
      a central magnetic layer having a first major surface, and an opposing second major surface; and
      a first reflector layer on the first major surface of the magnetic layer, and an opposing second reflector layer on the second major surface of the magnetic layer;
   a first dielectric layer overlying the first reflector layer, and a second dielectric layer overlying the second reflector layer; and
   a first absorber layer overlying the first dielectric layer, and a second absorber layer overlying the second dielectric layer.

7. The article of claim 6, wherein the first and second dielectric layers form a contiguous dielectric layer substantially surrounding the magnetic core section.

8. The article of claim 6, wherein the first and second absorber layers form a contiguous absorbing layer substantially surrounding the first and second dielectric layers and the magnetic core section.

9. The article of claim 7, wherein the first and second absorber layers form a contiguous coating layer substantially surrounding the contiguous dielectric layer.

10. The article of claim 1, wherein the magnetic pigments include multilayer pigments with a coating structure comprising:
    a central support layer having a first major surface and an opposing second major surface;
    a first magnetic layer on the first major surface of the support layer; and
    a second magnetic layer on the second major surface of the support layer.

11. The article of claim 10, wherein the first and second magnetic layers form a contiguous magnetic layer substantially surrounding the support layer.

12. The article of claim 1, wherein the magnetic pigments include multilayer pigments with a coating structure comprising:
    a central magnetic layer having a first major surface, and an opposing second major surface;
    a first dielectric layer on the first major surface of the magnetic layer; and
    a second dielectric layer on the second major surface of the magnetic layer.

13. The article of claim 12, wherein the first and second dielectric layers form a contiguous dielectric layer substantially surrounding the magnetic layer.

14. A coated article with an image thereon, the article comprising:
    a substrate; and
    a pigment coating overlying the substrate, the pigment coating comprising a pigment vehicle and a plurality of multilayer magnetic pigments having different optical characteristics based upon the angle of view dispersed in the pigment vehicle, the multilayer magnetic pigments comprising:
       a central magnetic layer having a first major surface, and an opposing second major surface;
       a first reflector layer on the first major surface of the magnetic layer; and
       a second reflector layer on the second major surface of the magnetic layer;
    said pigment coating including a plurality of multilayer magnetic pigments oriented in a non-parallel position with respect to a surface of the pigment coating in response to application of an imaged magnetic field, thereby producing an image.

15. A coated article as defined in claim 14, in which said pigment coating comprises:
    a first region where the magnetic pigments are oriented in a position substantially normal to a surface of the pigment coating, thereby giving the first region a black appearance at a substantially normal angle of viewing with respect to the surface of the pigment coating;

a second region where the magnetic pigments are oriented in a position substantially parallel to the surface of the pigment coating, thereby providing the second region with a first color; and a third region where the magnetic pigments are oriented in a position that is intermediate between normal and parallel with respect to the surface of the pigment coating, thereby providing the third region with a second color that is different from the first color.

16. A coated article with an image thereon, the article comprising:

a substrate; and a pigment coating overlying the substrate, the pigment coating comprising a pigment vehicle and a plurality of multilayer magnetic pigments having different optical characteristics based on the angle of view dispersed in the pigment vehicle, the multilayer magnetic pigments comprising:
  a central support layer having a first major surface and an opposing second major surface;
  a first magnetic layer on the first major surface of the support layer; and
  a second magnetic layer on the second major surface of the support layer, wherein said pigment coating including a plurality of said multilayer magnetic pigments oriented in a non-parallel position with respect to a surface of the pigment coating in response to application of an imaged magnetic field, thereby producing an image.

17. A coated article as defined in claim 16, in which said pigment coating comprises:

a first region where the magnetic pigments are oriented in a position substantially normal to a surface of the pigment coating, thereby giving the first region a black appearance at a substantially normal angle of viewing with respect to the surface of the pigment coating;

a second region where the magnetic pigments are oriented in a position substantially parallel to the surface of the pigment coating, thereby providing the second region with a first color; and a third region where the magnetic pigments are oriented in a position that is intermediate between normal and parallel with respect to the surface of the pigment coating, thereby providing the third region with a second color that is different from the first color.

18. A coated article with an image thereon, the article comprising:

a substrate; and a pigment coating overlying the substrate, the pigment coating comprising a pigment vehicle and a plurality of non-spherical multilayer magnetic pigments having different optical characteristics based upon the angle of view dispersed in the pigment vehicle, the multilayer magnetic pigments comprising:
  a central magnetic layer having a first major surface, and an opposing second major surface;
  a first dielectric layer on the first major surface of the magnetic layer; and
  a second dielectric layer on the second major surface of the magnetic layer;

selected said pigment coating including a plurality of said multilayer magnetic pigments oriented in a non-parallel position with respect to a surface of the pigment coating in response to application of an imaged magnetic field, thereby producing an image.

19. A coated article as defined in claim 18, in which said pigment coating comprises:

a first region where the magnetic pigments are oriented in a position substantially normal to a surface of the pigment coating, thereby giving the first region a black appearance at a substantially normal angle of viewing with respect to the surface of the pigment coating;

a second region where the magnetic pigments are oriented in a position substantially parallel to the surface of the pigment coating, thereby providing the second region with a first color; and a third region where the magnetic pigments are oriented in a position that is intermediate between normal and parallel with respect to the surface of the pigment coating, thereby providing the third region with a second color that is different from the first color.

20. A color shifting coated article with a three dimensional-like image thereon, the article comprising:

a substrate; and a pigment coating overlying the substrate, the pigment coating comprising a pigment vehicle and a plurality of non-spherical magnetic multilayer color shifting pigments dispersed in the pigment vehicle, the pigment coating comprising:
  a first region where the magnetic pigments are oriented in a position substantially normal to a surface of the pigment coating, thereby giving the first region a black appearance at a substantially normal angle of viewing with respect to the surface of the pigment coating;
  a second region where the magnetic pigments are oriented in a position substantially parallel to the surface of the pigment coating, thereby providing the second region with a first color; and
  a third region where the magnetic pigments are oriented in a position that is intermediate between normal and parallel with respect to the surface of the pigment coating, thereby providing the third region with a second color that is different from the first color;

said first, second, and third regions producing a three dimensional-like image with color shifting effects such that the image appears to move as the angle of view is changed.

21. A coated article with an image thereon, comprising:

a substrate;

a first coating overlying the substrate, said first coating including permanently magnetized particles, said coating applied onto the substrate so as to form a pattern;

a second coating overlying the first coating, said second coating containing a plurality of pigments susceptible to a magnetic field, said pigments having an aspect ratio that causes them to tend to lie flat in the absence of a magnetic field and to orient with an applied magnetic field during formation of the second coating so as to form an image corresponding to the pattern of magnetized particles in the first coating.

* * * * *